Sept. 15, 1936.    J. L. LEONARD    2,054,161
SOY BEAN OR LIKE HARVESTING ADAPTER FOR BINDERS
Filed April 8, 1935

INVENTOR.
John L. Leonard
BY
M. Talbert Dick
ATTORNEY.

Patented Sept. 15, 1936

2,054,161

UNITED STATES PATENT OFFICE 2,054,161

SOY BEAN OR LIKE HARVESTING ADAPTER FOR BINDERS

John L. Leonard, Strawberry Point, Iowa

Application April 8, 1935, Serial No. 15,282

6 Claims. (Cl. 56—312)

The principal object of my invention is to provide an attachment that may be easily and quickly secured to or removed from an ordinary grain binder and when once installed shields and covers certain of the sickle guards and portions of the sickle not being used, thereby making possible the successful harvesting of row planted soy beans or like.

A further object of my invention is to provide a soy bean harvesting attachment for grain binders that does not in any way damage the binder for use at a later date as a grain binder.

A still further object of my invention is to provide a soy bean harvesting adapter for grain binders that has no moving parts or mechanism.

A still further object of this invention is to provide a soy bean or like harvesting adapter for grain binders that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

The raising of soy beans in this country is on the increase. However, one of the chief objections to the raising of soy beans is the difficulty of cutting and harvesting them. Reconstructed corn binders have been used, but they only cut one row at a time, are costly, and are not really adapted to successfully and efficiently do this work. Ordinary grain binders are ideal for this type of work inasmuch as they can take two rows at a time, and also because most agriculturists have binders included in their farm equipment. The trouble with grain binders, however, is that they become fouled and clogged with certain of the vines of the beans and it is necessary for the operator to be continually stopping and clearing the binder of such collections. The principal reason for this clogging is that many of the vines are extending laterally to the axis of the row or longitudinally of the sickle and when cut, either have a tendency to lay and remain on the sickle guards and become entwined thereon or on attendant binder parts. Also, such stems or vines pull under the slats of the conveyor canvas, immediately resulting in binder trouble. It is also found that these laterally extending stems, by piling up near the sickle, retard the rearward movement of the other stems, thereby resulting in a very poorly bound bundle exiting from the binder. My attachment, which I will now describe, overcomes such troubles and objections.

Figure 2:
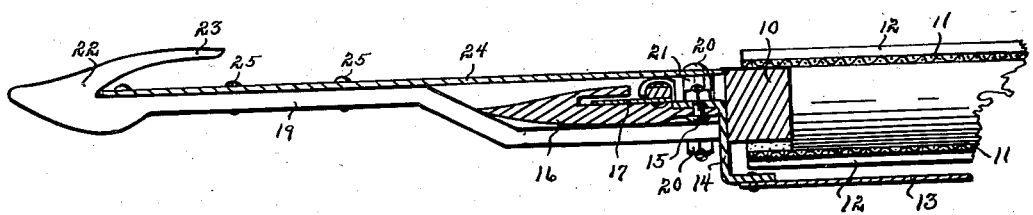
Fig. 2 is an enlarged cross-sectional view of my attachment mounted on a binder and is taken on line 2—2 of Fig. 1.

Referring to the drawing, I have used the numeral 10 to designate the binder platform frame carrying the usual rotatably mounted endless canvas belt conveyor 11. The numeral 12 designates the usual slats on the belt 11. The numeral 13 designates the usual binder platform bottom. The numeral 14 designates an angle bar on the forward side of the frame 10, as shown in Fig. 2.

Figure 1:
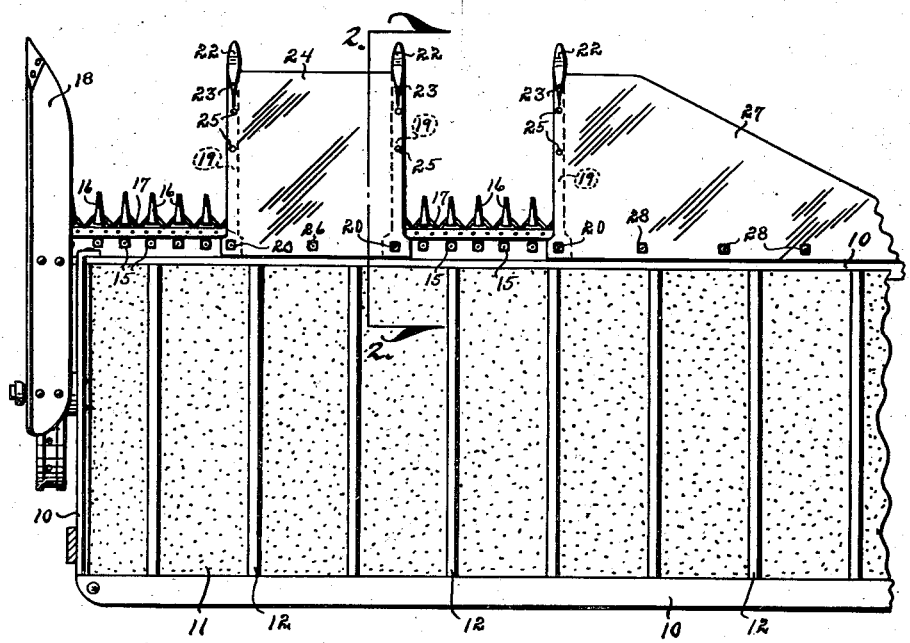
Fig. 1 is a top plan view of the sickle and platform portions of a binder or like with my attachment installed thereon and ready for use.

Secured to this bar 14 by bolts 15 are the usual plurality of sickle guards 16 arranged in row formation, as shown in Fig. 1. The numeral 17 designates the usual cutting sickle mounted for reciprocation through the guards 16. The numeral 18 designates the usual dividing-pick-up guard on the outer forward end of the binder platform. It is to such a device that I attach my adapter and which I will now explain.

The number of sections of my apparatus attached to the binder will be relative to the number of rows of beans or like to be harvested by the binder in one swath. Obviously, one row or a number of rows may be taken in a swath, but I have found that for the ordinary binder two rows are about right and in the drawing I show my apparatus arranged for two-row operations. This requires three forwardly extending guide supporting arms 19. These guide arms are suitably spaced apart as shown in Fig. 1, and are rigidly secured to the binder by removing a sickle guard bolt 15 for each of the arms 19 and substituting therefor a longer bolt which I have designated by the numeral 20. These three bolts 20 each extend through the rear end portion of one of the guide supporting arms 19, a guard 16, and the bar 14, thereby rigidly holding these members together and holding the arm 19 in a rigid forwardly extending position. The numeral 21 designates a spacing collar around each of the bolts 20 and above the bar 14, the purpose of which will be hereinafter appreciated.

The numeral 22 designates a pointed head on the forward outer free end of each of the arms 19. Each of these heads 22 has an upwardly and rearwardly extending prong 23. The numeral 24 designates a metal or like sheet member extending between the two arms 19 closest to the member 18 of the binder. This skirt 24 is rigidly secured to the two arms by rivets 25 and has its forward marginal edge extending under the prongs 23. The rear marginal edge of this skirt extends to a point where it overlaps the sickle and sickle guard, as shown in both Fig. 1 and Fig. 2.

The rear edge portion of this skirt should be rigidly held in a lowered position and this may be accomplished by running the bolts 20 through it and also a sickle guard bolt between the two arms may be removed and a longer bolt 26 substituted therefor, which will then pass through the sickle guard, the bar 14, and the skirt. A spacing collar 21 should encircle each of the bolts 20 and 26 and be between the skirt and bar 14 for giving rigidity to the bolt and holding the skirt in proper position. The numeral 27 designates another skirt of sheet metal or like secured to the third arm 19 and for the same purpose as the skirt 24. This skirt 27 is secured to the third arm in the same way by rivets and to the binder by the bolts 20 and 28, as shown in Fig. 1, the bolts 28 being elongated bolts substituted for the usual short guard bolts 15. Spacing collars 21 are also used on these bolts. By this arrangement of parts it will readily be seen that an open space will exist between the binder member 18 and the first arm 19 adjacent thereto and another open space will exist between the second and third arms from the binder member 18. These open spaces expose certain of the sickle guards and certain portions of the reciprocating cutting sickle. On the other hand the spaces between the first and second spaced apart arms 19 and the space to the right of the third arm 19, will be closed by the skirts which will cover and shroud the sickle guards and portions of the sickle in these vicinities.

The practical operation of my attachment is as follows: The binder is guided in such manner that the two rows of vegtation to be harvested will fall between the member 18 of the binder and the first arm 19 and between the second and third arms 19, respectively. The function of the member 18 will be somewhat similar to that of the adjacent arm 19 and its skirt in that its point will pass under the laterally extending stems of the vegetation, raise the same upwardly, and guide the vegetation so that it will successfully be contacted by the sickle and pass over and upon the conveyor canvas. Its complete functioning, however, is substantially different from that of the arms 19 and skirts as will readily be seen. As the binder moves forwardly the heads of the arms 19 will pass under the stems of the beans or like that are extending laterally to the arms 19 and will move these branches or stems upwardly and on top of the skirts. This is accomplished by the upwardly and rearwardly extending prongs 23, which tend to lift the vegetation over the forward marginal edge of the skirts. As soon as the laterally extending stems have been raised upon the skirts they will slide easily thereupon and completely past the sickle guards and sickle and onto the conveyor canvas. The reason for this is that the skirts shroud these certain portions of the sickle and certain of the sickle guards and these laterally extending stems or vines have no chance to become clogged in the sickle or sickle guard mechanism, or to pile up undesirably upon the same and before they properly reach the canvas. Taking the illustration of a row of soy beans between the second and third arms 19, all the side branches or stems would be raised upwardly on the skirt and as they would slide easily on the skirt they would reach easily a suitable point on the canvas conveyor and at points substantially in the rear of the forward marginal edge of the canvas, thereby not only eliminating clogging and fouling of the binder, but making possible excellent and properly tied bundles exiting from the binder.

Obviously, the vegetation will be cut quite close to the ground and near the roots and the stems of the vegetation will not be cut in several pieces, which would otherwise be the case if the laterally extending portions of the vegetation were not prevented from engaging the sickle. This means a great saving of not only the leaf and stem portions of the soy beans, but also the valuable pods. With such an attachment as I have described on a binder no difficulty is experienced in its clogging up and much is saved in time, labor, and vegetation material.

The attachment may be easily removed or replaced as only elongated sickle guard bar bolts are used to secure it to the binder. Obviously, any number of arms 19 and complementary shield skirts may be used, depending on whether it is desired to harvest one row at a time or a plurality of rows.

Some changes may be made in the construction and arrangement of my improved soy bean or like harvesting adapter for binders without departing from the real spirit and purpose of my invention, and it is my intention to cover by my claims any modified forms of structure or use of mechanical equivalents which may be reasonably included within their scope.

I claim:

1. In combination with a grain binder having a conveyor platform, a conveyor, a sickle, and sickle guards, a vine harvesting adapter comprising forwardly extending parallel non-movable arms designed to be rigidly secured to the binder, a guiding and lifting head element on each of said arms, and a skirt member secured to each of said arms and extending only to one side of said arm and to a point where certain of said sickle guards and a portion of said sickle are overlapped and shrouded at that side of said arm.

2. In combination with a grain binder having a conveyor platform, a conveyor, a sickle, and sickle guards, a vine harvesting adapter comprising a forwardly extending arm secured to said binder at a point where there are sickle guards at each side of it, and a flat substantially horizontal skirt element on said arm and extending to one side of said arm and over some of said sickle guards and a portion of said sickle at that side of said arm.

3. In combination with a grain binder having a sickle and sickle guards, a vine harvesting attachment comprising two forwardly extending arms operatively secured to said binder and extending to a point substantially in advance of said sickle, a head element on the forward end of each of said arms, and a sheet member secured to said arms extending between said arms and over said sickle and said sickle guards located between said arms.

4. In combination with a grain binder having a sickle and sickle guards, a vine harvesting attachment comprising two spaced apart forwardly extending arms operatively secured to said binder and extending above and forward of said sickle and sickle guards, and a sheet element extending between said arms over the section of the sickle and sickle guards between the two arms and rigidly secured to said arms.

5. In combination with a binder having a sickle and sickle guards, a vine harvesting adapter comprising two spaced apart forwardly extending arms operatively secured to said binder and extending to points substantially forward of said sickle and sickle guards, a head on each of said arms having an upwardly and rearwardly extending prong, and a sheet element above and extending between said arms having its forward end portion extending under said prongs and its rear end portion extending over the portion of said sickle and sickle guards located between said two arms.

6. In combination with a cutting apparatus having a sickle and sickle guards, a plurality of spaced apart forwardly extending arms secured to said apparatus and extending to points forward of said sickle and sickle guards, and a flat element secured to each of said arms and extending rearwardly to a point above and to the rear of said sickle and said sickle guards located between said arms.

JOHN L. LEONARD.